Aug. 16, 1960 D. G. LOGAN 2,949,502

TELEPHONE DICTATING SYSTEM WITH IN-PHASE CONTROL SIGNALS

Filed July 23, 1953 2 Sheets-Sheet 1

INVENTOR
DAVID GERALD LOGAN
by Campbell, Brumbaugh, Free & Graves
ATTORNEYS

TELEPHONE DICTATING SYSTEM WITH IN-PHASE CONTROL SIGNALS

Filed July 23, 1953

2 Sheets-Sheet 2

INVENTOR

DAVID GERALD LOGAN by Campbell, Brumbaugh, Free & Graves

ATTORNEYS

United States Patent Office 2,949,502
Patented Aug. 16, 1960

2,949,502

TELEPHONE DICTATING SYSTEM WITH IN-PHASE CONTROL SIGNALS

David Gerald Logan, Southchurch, Southend-on-Sea, England, assignor to Unilever Limited, Port Sunlight, England, a British company Filed July 23, 1953, Ser. No. 369,838

Claims priority, application Great Britain Aug. 28, 1952

7 Claims. (Cl. 179—6)

This invention relates to a method and apparatus for controlling sound recording and reproducing machines, generally referred to as dictating machines.

It has heretofore been proposed to couple a dictating machine to a telephone set (hereinafter referred to as the main station telephone set) so that when the main station telephone set is connected to a second telephone set, (hereinafter referred to as the dictator's telephone set) a message can be dictated into the dictator's telephone set and recorded by the dictating machine. However, in order that the dictator at the dictator's telephone set can set the dictating machine to the required conditions, namely "start," "stop," "record," "listen" (or "playback") and "back-space," complex control apparatus or additional wiring systems are required.

It is an object of the present invention to provide an improved method and apparatus which enables a dictator at the dictator's telephone set, after his call has been accepted, to set the dictating machine to which it is connected by the telephone system to all the conditions required for normal operation to enable him to record a message, to back-space and listen to the previously recorded message, to correct a passage and to stop the machine.

According to the present invention there is provided a method of controlling a dictating machine over a telephone system to which it is connected for speech transmission, which method comprises injecting into the telephone system a plurality of different and substantially constant alternating current switching signals, transmitting the signals over the telephone system, and utilising the transmitted signals to set the dictating machine to the required condition.

According to the present invention there is also provided an apparatus for controlling a dictating machine over a telephone system, which apparatus comprises a remote controller for producing a plurality of different and substantially constant alternating current switching signals capable of transmission by the telephone system, and a main station controller responsive to the switching signals for setting the dictating machine to the required condition.

The switching signals may, for example, be an amplitude or a frequency modulated carrier, the modulation for each signal being different and substantially constant. In that case the main station controller responds to the modulation of the carrier. Preferably, however, each of the switching signals is of a different and substantially constant frequency and is preferably in the audio frequency range.

The switching signals may be injected into the telephone system between earth and one of the telephone lines and transferred from the telephone system between earth and that telephone line. Preferably, the switching signals are injected into the telephone system between earth and the common point of two substantially identical impedances and transferred from the telephone system between earth and the common point of two substantially identical impedances.

The telephone system may be a public or a private internal telephone system.

The switching means are preferably electro-magnetic relays, or electro-magnetic actuators, or motor operated cams, or a combination of these, the choice of the switching means being dependent upon the control means with which the dictating machine is provided.

Preferred embodiments of the invention will now be described with reference to the accompanying drawings in which.

Figure 1:
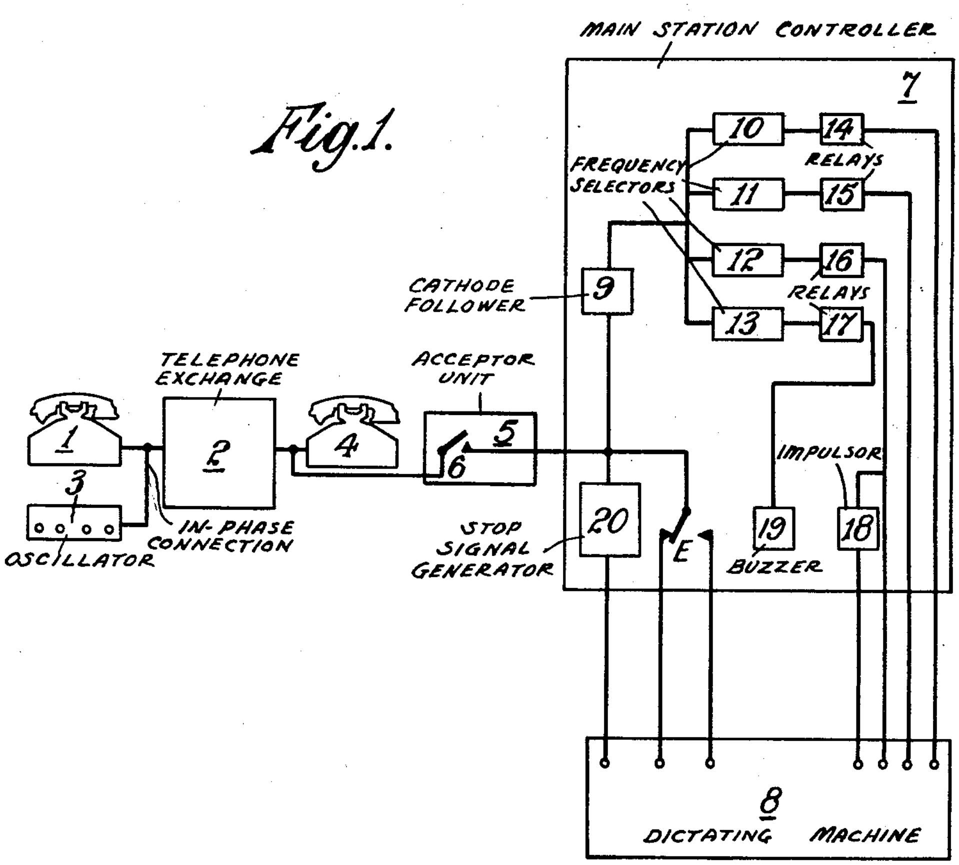
Fig. 1 shows a functional block diagram.

Referring to Fig. 1, the dictator's telephone set 1 is connected by means of the telephone lines to a telephone exchange 2. The remote controller in the form of an oscillator 3 is connected to the telephone lines at the dictator's telephone set. This oscillator is capable of producing four switching signals each of which is of a different and substantially constant audio frequency on operation of four push button switches. The telephone exchange 2 is connected by means of the telephone lines to the main station telephone set 4. The telephone lines at the main station telephone set 4 are also connected via an acceptor unit 5 provided with a switch 6 to the main station controller 7 and from there to the dictating machine 8.

The main station controller 7 comprises a cathode follower 9 which feeds four selectors 10, 11, 12 and 13 in parallel. Each selector comprises a band-pass filter, tuned to one of the frequencies of the oscillator 3, and a detector rectifier. Each selector is followed by an electronic relay 14, 15, 16 and 17 respectively. The first three electronic relays cause operation of the conventional controls of the dictating machine, namely "record," "stop," and "listen" and "back-space," respectively. The back-spacing controller is actuated through a back-spacing impulsor 18. The electronic relay 17 controls a "call-operator" buzzer 19. The input of the cathode follower 9 is connected to the telephone lines through switch 6 for the transmission of switching signals.

The input and output terminals of the dictating machine corresponding to "record" and "listen" are connected by the change-over contacts of a relay E through switch 6 to the telephone lines for the transmission of speech.

The main station controller also comprises an oscillator 20 (hereinafter referred to as the stop signal generator) which is capable of producing audible notes to indicate "stop" and "end of recording medium." The stop signal generator is also connected through switch 6 to the telephone lines.

The mode of operation will now be described in simplified form with reference to Fig. 1. The dictator dials the number of the main station telephone. When the main station telephone rings, an operator lifts the receiver and, on being informed that the dictating machine is required, closes switch 6. The dictator can now switch the dictating machine to the required conditions without further assistance from the operator.

The dictator now presses the "record" switch button on the oscillator 3. The oscillator thereupon injects a signal of a frequency corresponding to the band pass frequency of selector 10 into the telephone lines at the dictator's telephone set. This switching signal is transmitted over the telephone lines via the exchange 2 to the acceptor unit 5 and switch 6 and, from there, to the cathode follower 9 which feeds the four selectors. As the frequency of the switching signal corresponds to the frequency of the filter of selector 10, the signal is rectified by the detector of selector 10. The output of the detector, i.e. of the selector, then actuates the electronic relay 14 which, in turn, starts the dictating machine and switches it to the "record" condition. The electronic relay 14 also causes the change-over contacts of relay E to connect the telephone lines to the speech input terminals of the dictating machine. The dictator then dictates his message which is transmitted over the telephone lines via the exchange 2 to the acceptor unit 5 and switch 6 and, from there, over the contacts of relay E to the speech input terminals of the dictating machine.

On completion of the message, the dictator presses the "stop" button. The freqency generated by the oscillator 3 now corresponds to that of selector 11 and, in the above described manner, electronic relay 15 is actuated and switches the dictating machine to the "stop" condition and causes the change-over contacts of relay E to connect the telephone lines to the speech output terminals of the dictating machine.

Should the dictator desire to have part of the previously recorded message repeated, he presses the "listen" switch button. The frequency generated by the oscillator 3 now corresponds to that of selector 12 and, in the above described manner, electronic relay 16 is actuated. The relay starts the machine and switches it to the "listen" condition. In addition, as long as the "listen" switch button is pressed, the back-spacing impulsor 18 which, as mentioned earlier, is also controlled by the electronic relay 16, sends a series of impulses to the back-spacing mechanism in the dictating machine. The arrangement is such that the record-playback head of the machine is moved back through a distance corresponding to approximately four seconds of recording for each impulse received. The dictator continues to press the "listen" button until the record-playback head has been back-spaced to the required passage of the recording. When the required passage has been reached, the dictator releases the "listen" switch button and the dictating machine then plays back the message.

The purpose of the back-spacing impulsor 18 is to enable the setting of the dictating machine to the "listen" condition as well as the back-spacing to be controlled by one channel, i.e. one switching signal and one selector with its associated electronic relay.

Should the dictator desire to erase a part of the message, he back-spaces to the required passage by operation of the "listen" button and then presses the "record" switch button thereby causing selector 10 to actuate the electronic relay 14 which switches the dictating machine to the "record" condition. The record-playback head of the dictating machine is in the "record" condition. The record-playback head is preceded by an erasing head which is energised when the dictating machine is set to the "record" condition. The dictating machine, therefore, now proceeds to erase the passage to be corrected. Simultaneously with the erasure the dictator can dictate the correct version.

Though setting the dictating machine to the required condition has been described as starting with the machine in the "stop" condition, there is no need to stop the machine prior to switching from one condition to another.

When the dictator has finished his recording, he presses the "call-operator" button. The frequency generated by the oscillator 3 now corresponds to that of selector 13 and, in the above described manner, electronic relay 17 is actuated and energises the buzzer 19. The attendant thereupon lifts the hand-set of his main station telephone set 4 and opens switch 6. The dictator can now give the operator any instructions he desires.

A more detailed description of the apparatus shown diagrammatically in Fig. 1, will now be given with reference to Fig. 2.

Although the present invention is applicable to various types of dictating machines, the preferred embodiment will be described with reference to a dictating machine which is provided with three electro-magnetic relays or actuators for setting it to the required condition. These relays or actuators consist of a "stop" actuator, a "listen-record" relay and a "back-space" actuator. One end of the winding of each relay or actuator is connected to one terminal of a two terminal source of D.C., the other terminal of that source being earthed. The other end of each winding is connected to a terminal 21, 22 and 23 respectively. The dictating machine is also provided with a terminal 24 which is connected through a cam operated switch, not shown, to earth. The cam operated switch is closed intermittently when the recording head is within thirty seconds of recording of the end of the recording medium. Terminals 21, 22, 23 and 24 are connected to terminals 25, 26, 27 and 28 respectively in the main station controller 7. The dictating machine is also provided with speech input terminals 29 and 30 and speech output terminals 31 and 32. These terminals are connected to terminals 33, 34, 35 and 36 in the main station controller 7.

Terminal 21 is connected to earth through a contact B3 in the main station controller 7. Thus, when the contact B3 is closed, the "stop" relay becomes energised and disengages the clutch thereby switching the dictating machine to the "stop" condition; if contact B3 is open, the terminal 21 is disconnected from earth and the clutch re-engages. Terminal 22 is connected to earth through contact E3 or contact B2 in the main station controller 7. Thus, when either contact E3 or B2 is closed the "listen-record" relay becomes enegized and switches the machine to the "listen" condition; if both contacts E3 and B2 are open, terminal 22 is disconnected from earth and the "listen-record" relay becomes de-energised and switches the machine to the "record" condition. Terminal 23 is connected to earth through contact F2 in the main station controller 7. Thus, when contact F2 is closed, the "back-space" actuator becomes energised and, through a pawl, ratchet wheel and screw, backspaces the "record-playback" head of the machine through a predetermined distance corresponding to approximately four seconds of recording. It will be evident that the "record-playback" head will be back-spaced through the predetermined distance once every time terminal 23 is earthed.

The dictator's telephone set 1 is of the conventional type and comprises a transmitter 37, a receiver 38, coils 39, 40 and 41, a cradle switch 42, a capacitor 43 and a bell 44. The dialing circuit is not shown. The telephone set is connected to the telephone lines by terminals 45 and 46.

The oscillator 3 is of the Hartley type and comprises a valve 47 having a tuned circuit 48 in its control grid circuit. Four capacitors 49, 50, 51 and 52 are connected in the tuned circuit. Across each capacitor is connected a switch 53, 54, 55 and 56 respectively, which is normally closed so that each capacitor is normally short circuited. By operating a switch, the short circuit across the corresponding capacitor is removed and this capacitor then constitutes the capacitance of the tuned circuit 48. The frequencies of the oscillator corresponding to operation of switches 53, 54, 55 and 56 (that is of capacitors 49, 50, 51 and 52) are 3 kc./s., 4 kc./s., 5 kc./s. and 7 kc./s., respectively. The output of the oscillator is fed to an amplifier valve 57 having the primary 58 of an output transformer 59 in its anode circuit. One side of the secondary 60 of the output transformer is earthed, the other side being taken through resistor 61 and capacitor 63 and resistor 62 and capacitor 64 to terminals 65 and 66 respectively. Terminals 65 and 66 are connected to the telephone lines at terminals 46 and 45 to enable the switching signals to be injected into the telephone system.

The conventional main station telephone set 4 has terminals 67 and 68 for connection to the telephone lines and comprises a transmitter 69, a receiver 70, three coils 71, 72 and 73, a capacitor 74, a bell 75, and a cradle switch 76.

The acceptor unit 5 has input terminals 77 and 78 which are connected to the terminals 67 and 68 in the main station telephone set, and output terminals 79 and 80 which are connected to terminals 85 and 84 in the main station controller. The input terminals are connected to the output terminals through contacts 86 and 87 of switch 6. The acceptor unit also comprises a lamp 90 connected through contact 89 on switch 6 to terminals 82 and 83, which are connected to a source of 6.3 volts A.C., not shown. Terminal 83 is earthed. Contact 88 is arranged to connect terminal 81 in the acceptor unit to the earthed terminal 83. Terminal 81 is connected to terminal 91 in the control unit which is connected via contact D2 and bias resistor 92 to the cathode of the valve of electronic relay 15. The bias resistor 92 is similar to the bias resistors in the cathode leads of the valves in the other electronic relays.

The terminals 84 and 85 are connected to the primary 94 of a transformer 95. The secondary 96 of transformer 95 is connected to the movable arms of change-over contacts E1 and E2 of relay E. The two pairs of fixed arms of contacts E1 and E2 are connected to terminals 33, 34 and 35, 36, respectively. Terminals 33 and 34 are connected to the speech input terminals 29 and 30 of the dictating machine, and terminals 35 and 36 to the speech output terminals 31 and 32.

Terminals 84 and 85 are also connected to a resistance network having resistors 97, 98, 99, 100 and 101. The common point of resistors 97 and 98 is connected via a capacitor to a potentiometer which is in the grid circuit of the valve 102 of the cathode follower 9. The output of the cathode follower 9 is fed to the four selectors 10, 11, 12 and 13, in parallel.

The selector 10 comprises a Wien bridge, having valves 103, 104 and 105, the output of which is passed to a detector rectifier 106. The Wien bridge is tuned to 3 kc./s. The output of the detector rectifier operates the electronic relay which is in the form of a valve 107 having a relay A in its anode circuit. The relay has two contacts, A1 and A2 respectively, which are both open when the relay is de-energised. Selectors 11, 12, and 13 are similar to selector 10 except that their Wien bridges are tuned to 4 kc./s., 5 kc./s. and 7 kc./s. respectively.

Each selector and associated relay is so arranged that its relay (A, B, C and D respectively) is de-energised when a signal having the same frequency as the band pass frequency of its Wien bridge is applied to the input of its selector.

The stop signal generator 20 is a Hartley oscillator having an oscillator valve 108 and a tuned circuit 109. The tuned circuit includes a capacitor 110 which is connected to the earth line through contact B1 of relay B. The tuned circuit oscillates at 400 c./s. The common point between contact B1 and the capacitor is taken to a terminal 28 which is connected to terminal 24 in the dictating machine. As stated above, terminal 24 is connected through a cam operated switch, not shown, to earth. The cam operated switch is closed intermittently when the recording head is within thirty seconds of recording from the end of the recording medium. Thus, the capacitor is connected into the tuned circuit, thereby causing the oscillator to oscillate, when either contact B1 or the cam operated switch is closed. Consequently, the oscillator produces a continuous note when the machine is stopped and an intermittent note or "pips" when the recording head has almost reached the end of the recording medium. In order to avoid spurious oscillations a resistor 111 is connected between terminal 28 and earth. The output of the oscillator is amplified by a valve 112 having the primary 113 of an output transformer 114 in its anode circuit. The secondary 115 of the transformer 114 is connected across resistor 100 from where the signal is passed to the dictator's telephone set.

The buzzer 19 has one end of its winding earthed, the other end being connected through contact D1 of relay D to terminal 116 which is connected to a suitable source of D.C.

The relay circuits and their functions will now be described in conjunction with a description of the operation of the apparatus.

Figure 2:
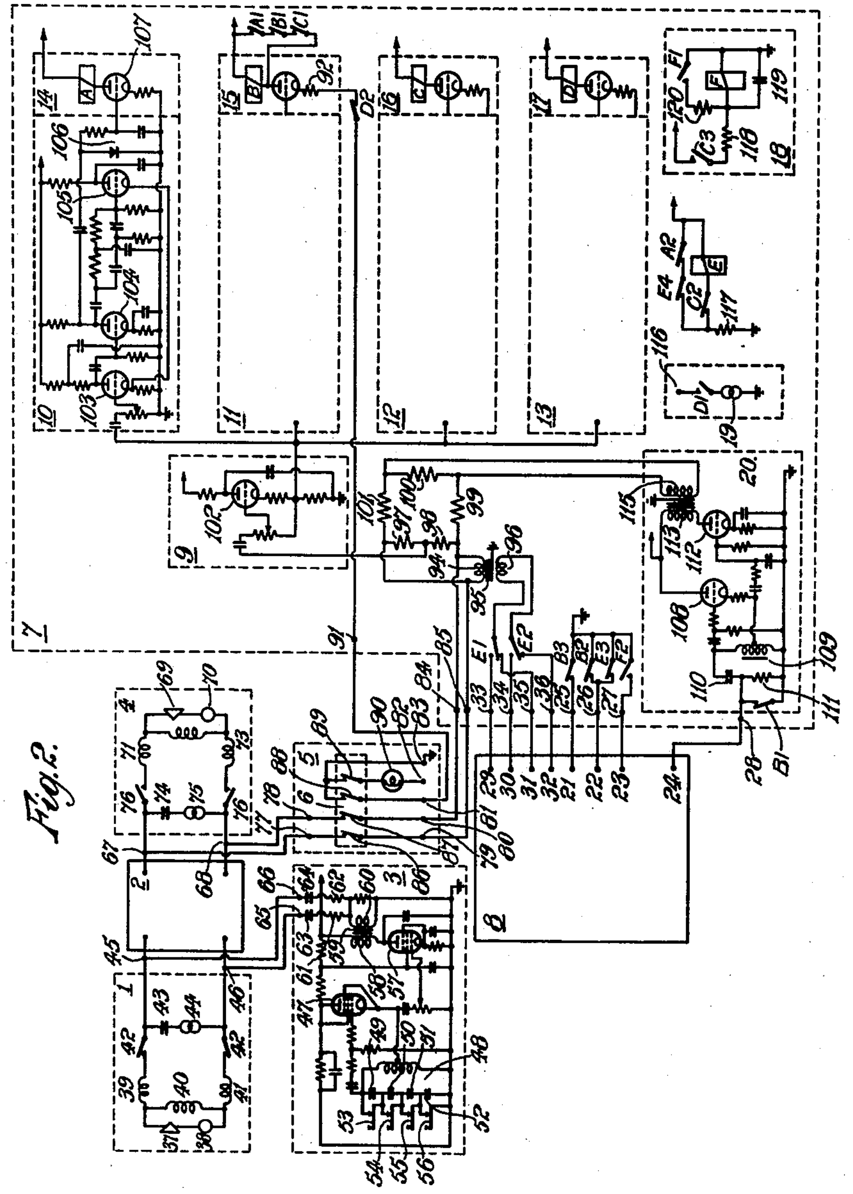
Fig. 2 shows a circuit diagram.

Fig. 2 shows the apparatus switched on with the relays in the "stop" condition.

When the dictator desires to dictate he lifts the hand-set of his telephone set 1 and dials the main station telephone number. When the bell 75 of the main station telephone rings, the operator lifts the hand-set thereby closing cradle switch 76. The operator, on being informed by the dictator that the dictating machine is required, operates switch 6 to close its contacts 86–89. The closing of contacts 86 and 87 connects terminals 84 and 85 to the telephone lines. The impedance of the primary 94 of transformer 95 is similar to that of the main station telephone set after the cradle switch, so that the main station hand-set may now, if desired, be replaced. The closing of contact 88 connects contact D2 in the cathode circuit of the valve of electronic relay 15 to earth. The closing of contact 89 completes the circuit for the warning light 90 which lights up to indicate that the recording machine is engaged. The dictator now hears a 400 c./s. stop signal in his receiver, indicating that the machine is in the "stop" condition.

The dictator now pressed the "record" switch button 53. This connects capacitor 49 into the tuned circuit 48 of the oscillator 3, causing it to generate a 3 kc./s. signal. This signal is injected into the telephone system at terminals 45 and 46. It is then passed over the telephone lines to the telephone exchange 2 and from there via terminals 67 and 68, and contacts 86 and 87 of switch 6 to terminals 85 and 84 and from there to the resistors 97 and 98. From the common point of resistors 97 and 98 the signal is passed to the input of the cathode follower 9 and from there to the four selectors.

The 3 kc./s. switching signal corresponds to the band pass frequency of the Wien bridge of selector 10 and, after detection, operates the electronic relay 14 thereby de-energising the relay A causing its contacts A1 and A2 to open. A relay E is arranged to be energised through contact C2 in series with a resistor 117. Contact A2 and contact E4 are connected in parallel with relay E and contact C2. Opening of contact A2 removes the short circuit across relay E which thereupon becomes energised. This causes the change-over contacts E1 and E2 to switch the secondary 96 of transformer 95 to the speech input terminals 29 and 30, and opens contacts E3 and E4. Due to the opening of contacts E3 (B2 will also be open as stated below) terminal 22 of the "listen-record" relay is disconnected from earth and the "listen-record" relay therefore becomes de-energised and switches the dictating machine to the "record" condition. Opening of contact E4 ensures that relay E cannot become short circuited when the "record" switch button 53 is released. Upon contact A1 opening, relay B, which was previously short circuited through its own contact B4 in series with contacts A1 and C1, now becomes energised. On relay B becoming energised all its contacts open. Opening of contact B4 ensures that the short circuit across relay B cannot be re-established when contact A1 closes upon release of the "record" switch button 53; opening of contact B3 disconnects the terminal 21 of the "stop" relay from earth and thereby starts the dictating machine; opening of contact B2, together with opening of contact E3, as stated above, switches the dictating machine to the "record" condition. Opening of contact B1 effectively disconnects the capacitor 110 from the tuned circuit 109 of the "stop" signal generator 20. The "stop" signal, which was audible after operation of switch 6, now ceases. The dictator now dictates his message.

In order to stop the machine, the dictator operates the "stop" switch button 54 whereupon the oscillator 3 generates a signal of 4 kc./s. which, in the above described manner, causes the de-energisation of relay B of the electronic relay 15. De-energisation of relay B closes all its contacts. Closing of contact B4 re-establishes the short circuit across relay B; closing of contact B3 stops the dictating machine; closing of contact B1 effectively connects capacitor 110 into the tuned circuit of the stop signal generator 20 causing it to generate the audible "stop" signal; closing of contact B2 switches the dictating machine to the "listen" condition.

In order to switch the dictating machine to the "listen" condition, the dictator presses the "listen" switch button 55 whereupon the oscillator generates a signal of 5 kc./s. which, in the above described manner, causes the de-energisation of relay C of electronic relay 16. De-energisation of relay C opens its contacts C1 and C2 and closes its contact C3. Opening of contact C1 removes the short circuit across relay B which thereupon becomes energised. All the contacts of relay B thereupon open. Opening of contact B4 ensures that the short circuit across relay B cannot be re-established when contact C1 closes upon release of the "listen" switch button 55; opening of contact B3 starts the dictating machine; opening of contact B1 disconnects the capacitor 110 from the tuned circuit 109 of the stop signal generator 20. The "stop" signal, which was audible when the machine was in the "stop" condition, now ceases. Opening of contact C2 de-energises relay E. Thereupon its contacts E3 and E4 close and its change-over contacts E1 and E2 connect the secondary 96 of transformer 95 to the speech output terminals 31 and 32. The closing of contact E3 (despite contact B2 being open) connects terminal 22 of the "listen-record" relay to earth thereby energising it so that it switches the dictating machine to the "listen" condition. The closing of contact E4 re-establishes the short circuit across relay E to ensure that when contact C2 closes upon release of the "listen" switch button 55, relay E remains de-energised. The closing of contacts C3 energises relay F through resistor 118. In parallel with relay F is a capacitor 119 and also its own contact F1 in series with a resistor 120. Due to the energisation of relay F its contact F1 closes and due to the time constant of resistor 118 and capacitor 119 the relay F starts pulsating. This causes its contact F2 to open and close continuously. Thus, contact F2 intermittently connects terminal 23 of the "back-space" relay to earth, thereby energising the back-spacing actuator. The actuator back-spaces the "record-playback" head of the machine through a distance corresponding to approximately 4 seconds of recording every time contact F2 closes. Thus, as long as the "listen" switch button is depressed, the playback head is moved back until the required passage of the recording is reached, whereupon the "listen" switch button is released. The dictating machine which has already been switched to the "listen" condition thereupon plays back the message.

Should the dictator wish to call the operator, he presses the "call operator" switch button 56 whereupon the oscillator 3 generates a 7 kc./s. signal which, in the above described manner, causes de-energisation of relay D of electronic relay 17. De-energisation of relay D closes its contact D1 and opens its contact D2. Closing of contact D1 connects the buzzer 19 via terminal 116 to a source of D.C. The buzzer thereupon produces an audible signal to call the operator. The opening of contact D2 disconnects the cathode bias resistor 92 of the valve of electronic relay 15 from earth thereby causing relay B to become de-energised. Upon relay B becoming de-energised, the machine is stopped as described above. The operator then lifts the hand-set of his main station telephone set 4 and opens switch 6. The dictator can now give the operator any instructions he desires.

Though in the above described operation of the apparatus the dictator communicates with the operator at the beginning and at the end of the dictation, no such communications is actually necessary. Thus, if desired, the operator merely closes switch 6 when the main station telephone bell rings at the beginning of operation to accept the call, and opens switch 6 to release the call and replaces the recording medium when the call operator lamp 90 is lit at the end of the dictation due to the dictator pressing the "call operator" switch button. If it is intended to use the apparatus without any communication taking place between the dictator and the operator, the main station telephone set can be replaced by a bell and a capacitor corresponding to the bell 75 and capacitor 74.

Although the operation has been described with reference to manual acceptance and release of the dictator's call, this acceptance and release can on some telephone systems be made automatic.

I claim:

1. An apparatus for controlling a dictating machine over a telephone system having two transmission lines, which apparatus comprises a remote controller having generating means for producing a plurality of predetermined alternating current switching signals which differ from one another in frequency, said generating means being connected in phase to said lines at a dictating station for injection of the switching signals, and a main station controller having switching means for setting the dictating machine to a plurality of required conditions including a desired condition in full response to said switching signals to enable the recording of a message on and reproduction of at least part of the said message from the dictating machine during one telephone call, the main station controller having means to maintain the dictating machine in the desired condition for substantially only the period that the switching signal corresponding to the desired condition is being received, whereby said switching signals cause relatively little interference with speech transmission over the telephone lines.

2. An apparatus for controlling a dictating machine over a telephone system having two transmission lines, which apparatus comprises a remote controller having generating means for producing a plurality of predetermined alternating current switching signals which differ from one another in frequency, said generating means being connected in phase to said lines at a dictating station for injection of the switching signals, and a main station controller having switching means for setting the dictating machine to a plurality of required conditions including a backspace condition and a listening condition in full response to said switching signals to enable the recording of a message on and reproduction of at least part of the said message from the dictating machine during one telephone call, the main station controller having means to maintain the switching means in the backspace condition for substantially only the period that the switching signal corresponding to the backspace condition is being received, and said maintaining means also switching the dictating machine to the listening condition in response to the switching signal corresponding to the backspace condition, whereby said switching signals cause relatively little interference with speech transmission over the telephone lines.

3. An apparatus for controlling a dictating machine over a telephone system having two transmission lines, which apparatus comprises a remote controller having generating means for producing a plurality of predetermined alternating current switching signals which differ from one another in frequency, said generating means being connected in phase to said lines at a dictating station for injection of the switching signals, and a main station controller having switching means for setting the dictating machine to a plurality of required conditions including a desired condition in full response to said switching signals to enable the recording of a message on and reproduction of at least part of the message from the dictating machine during one telephone call, said switching means being responsive to said signals to set the dictating machine to the desired condition at any time during the operation of the system, whereby said switching signals have little interference with speech transmission over the telephone lines.

4. An apparatus according to claim 3 wherein the switching means includes a plurality of selectors each of which responds to the frequency of one of the switching signals.

5. An apparatus according to claim 4 wherein each of the selectors comprises a band pass filter tuned to the frequency of one of the switching signals.

6. An apparatus according to claim 4 wherein the switching means includes means responsive to individual actuation of each of the selectors to set the dictating machine to a corresponding operation condition.

7. An apparatus according to claim 6 wherein the means responsive to actuation of each selector includes a detector rectifier circuit.

References Cited in the file of this patent

UNITED STATES PATENTS

| | | |
|---|---|---|
| 1,915,413 | Elkins | June 27, 1933 |
| 2,329,107 | Clausen | Sept. 7, 1943 |
| 2,427,850 | Gehman | Sept. 23, 1947 |
| 2,519,318 | Kuhlik | Aug. 15, 1950 |
| 2,537,407 | Handschin | Nov. 29, 1950 |
| 2,784,254 | Lane | Mar. 5, 1957 |